United States Patent
Kumar

(10) Patent No.: US 11,290,620 B2
(45) Date of Patent: *Mar. 29, 2022

(54) SYNCHRONIZING MEDIA IN MULTIPLE DEVICES

(71) Applicant: Sling Media Pvt. Ltd., Bangalore (IN)

(72) Inventor: Amit Kumar, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,353

(22) Filed: Sep. 29, 2020

(65) Prior Publication Data

US 2021/0014386 A1 Jan. 14, 2021

Related U.S. Application Data

(63) Continuation of application No. 15/871,904, filed on Jan. 15, 2018, now Pat. No. 10,798,270.

(30) Foreign Application Priority Data

Mar. 10, 2017 (IN) .............................. 201741008426

(51) Int. Cl.
| | | |
|---|---|---|
| *H04N 5/04* | (2006.01) | |
| *H04L 7/00* | (2006.01) | |
| *H04N 21/218* | (2011.01) | |
| *H04N 21/242* | (2011.01) | |
| *H04N 21/8547* | (2011.01) | |
| *H04N 21/43* | (2011.01) | |
| *H04N 21/234* | (2011.01) | |
| *H04N 21/845* | (2011.01) | |

(52) U.S. Cl.
CPC ............. *H04N 5/04* (2013.01); *H04L 7/0012* (2013.01); *H04N 21/21805* (2013.01); *H04N 21/23424* (2013.01); *H04N 21/242* (2013.01); *H04N 21/43076* (2020.08); *H04N 21/8456* (2013.01); *H04N 21/8547* (2013.01)

(58) Field of Classification Search
CPC ............... H04N 5/04; H04N 21/21805; H04N 21/23424; H04N 21/242; H04N 21/4307; H04N 21/8456; H04N 21/8547; H04L 7/0012
USPC .......................................... 725/118; 348/500
See application file for complete search history.

(56) References Cited

U.S. PATENT DOCUMENTS

| 6,069,902 A | 5/2000 | Kurano et al. |
|---|---|---|
| 6,236,623 B1 | 5/2001 | Read |

(Continued)

FOREIGN PATENT DOCUMENTS

| EP | 1622382 A1 | 2/2006 |
|---|---|---|
| WO | 2016068768 A1 | 5/2016 |

OTHER PUBLICATIONS

PCT/IB2018/000092 International Search Report and Written Opinion dated Apr. 16, 2018 (15 pages).

*Primary Examiner* — Trang U Tran
(74) *Attorney, Agent, or Firm* — Perkins Coie LLP

(57) ABSTRACT

A system includes a processor and a memory. The memory stores instructions executable by the processor to receive first and second media units with respective first and second time stamps that are assigned based on a first clock cycle time and a data transmission rate, and to assign an adjusted time stamp to the second media unit based on the first clock cycle time, a second clock cycle time, the first time stamp, and the data transmission rate.

20 Claims, 7 Drawing Sheets

(56) References Cited

U.S. PATENT DOCUMENTS

| | | | |
|---|---|---|---|
| 6,871,312 B2* | 3/2005 | Hatley | H03M 13/091 |
| | | | 714/701 |
| 7,251,199 B2* | 7/2007 | Eidson | G04G 5/00 |
| | | | 368/46 |
| 7,382,966 B2 | 6/2008 | Kobayashi et al. | |
| 8,620,134 B2 | 12/2013 | Koyanagi et al. | |
| 8,665,969 B2 | 3/2014 | Kranawetter et al. | |
| 8,677,420 B2 | 3/2014 | Cromarty et al. | |
| 9,319,054 B2 | 4/2016 | Webb, III et al. | |
| 2004/0010729 A1 | 1/2004 | Lockridge et al. | |
| 2005/0013593 A1 | 1/2005 | Jung et al. | |
| 2016/0165266 A1* | 6/2016 | Bocharnikov | H04N 21/242 |
| | | | 725/109 |
| 2017/0064342 A1 | 3/2017 | Nelson et al. | |
| 2018/0262655 A1 | 9/2018 | Kumar | |

\* cited by examiner

SYNCHRONIZING MEDIA IN MULTIPLE DEVICES

CROSS-REFERENCE TO RELATED APPLICATIONS

This patent application is a continuation of U.S. patent application Ser. No. 15/871,904, filed on Jan. 15, 2018, entitled "SYNCHRONIZING MEDIA IN MULTIPLE DEVICES," which claims priority to and all the benefits of Indian Provisional Patent Application No. 201741008426, filed on Mar. 10, 2017, entitled "SYNCHRONIZING MEDIA IN MULTIPLE DEVICES," both incorporated herein by reference in their entirety.

BACKGROUND

The use of streamed media data such as video data has increased rapidly. Videos are used for instructional purposes, to record and view sports events, to share personal and family events, to sell real estate, etc. Typically, a transmitter streams media data to a receiver periodically based on a transmission rate, e.g., 25 frames per second (fps). Nevertheless, while the receiver reproduces and/or records the received streamed media, a difference between the timing of media units determined by the transmitter versus a timing that the receiver expects may cause difficulties at the receiver.

DETAILED DESCRIPTION

Introduction

Figure 1:
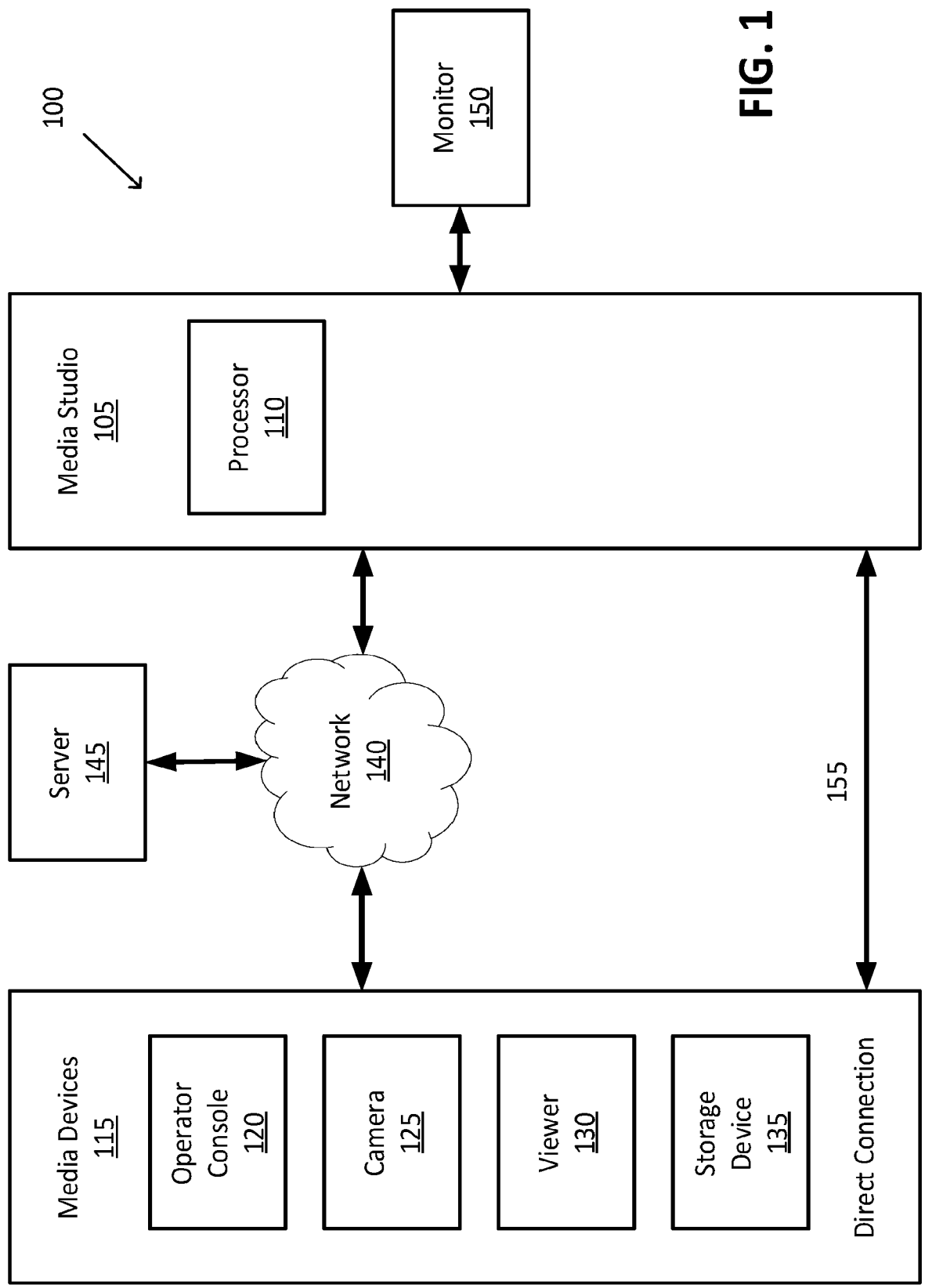
FIG. 1 is a block diagram of an exemplary media processing system for capturing and mixing multiple media streams into an output media stream.

Disclosed herein is a system including a processor and a memory. The memory stores instructions executable by the processor to receive first and second media units with respective first and second time stamps that are assigned based on a first clock cycle time and a data transmission rate, and to assign an adjusted time stamp to the second media unit based on the first clock cycle time, a second clock cycle time, the first time stamp, and the data transmission rate.

The adjusted time stamp may be a nearest time stamp to the second time stamp based on the transmission rate, and is divisible by the second clock cycle time.

The second clock cycle time may be less than the first clock cycle time.

The memory may store instructions executable by the processor to assign the adjusted time stamp to the second media unit only upon determining that the second time stamp is within an expected time interval.

The instructions may include further instructions to discard the second media unit upon determining that the second time stamp is outside the expected time interval.

The instructions may include further instructions to discard the second media unit only upon determining that the second time stamp is outside the expected time interval and within a second time threshold greater than the expected time interval.

The instructions may include further instructions to re-use the first media unit instead of the second media unit upon discarding the second media unit.

The instructions include further instructions to re-use the first media unit by assigning the adjusted time stamp to the first media unit and processing the first media unit with the adjusted time stamp as a replacement for the discarded second media unit.

The instructions may include further instructions to determine the expected time interval based on the first clock cycle time and a plurality of time stamps associated with a plurality of last received media units.

The instructions may include further instructions to determine the expected time interval based on an expected time stamp and a maximum deviation threshold.

The instructions may include further instructions to prevent an adjustment of the second time stamp upon determining that the second time stamp is outside an expected time interval.

The instructions may include further instructions to determine a second expected time interval for a third media unit that is expected subsequent to the second media unit, based at least in part on the second time stamp.

The instructions may include further instructions to receive the third media unit, subsequent to the second media unit, with a third time stamp, and to assign an adjusted third time stamp to the third media unit based at least in part on the second time stamp.

The instructions may include further instructions to repeat the first media unit upon determining that the second time stamp is outside an expected time interval and outside a second time threshold greater than the expected time interval.

Further disclosed herein is a method including receiving first and second media units with respective first and second time stamps that are assigned based on a first clock cycle time and a data transmission rate, and assigning an adjusted time stamp to the second media unit based on the first clock cycle time, a second clock cycle time, the first time stamp, and the data transmission rate.

The method may further include discarding the second media unit only upon determining that the second time stamp is outside the expected time interval and within a second time threshold greater than the expected time interval.

The method may further include repeating the first media unit upon determining that the second time stamp is outside an expected time interval and outside a second time threshold greater than the expected time interval.

Further disclosed herein is a system including a client device computer programmed to transmit first and second media units. The system includes a media studio computer programmed to receive, from a media device, first and second media units with respective first and second time stamps that are assigned based on a first clock cycle time and a data transmission rate, and to assign an adjusted time stamp to the second media unit based on the first clock cycle time, a second clock cycle time, the first time stamp, and the data transmission rate.

The media studio computer may be further programmed to repeat the first media unit upon determining that the second time stamp is outside an expected time interval and outside a second time threshold greater than the expected time interval.

The media studio computer may be further programmed to discard the second media unit only upon determining that the second time stamp is outside the expected time interval and within a second time threshold greater than the expected time interval.

Further disclosed herein is a computer that is programmed to execute any of above method steps.

Yet further disclosed herein is a computer-readable medium, storing program instructions for executing any of above method steps.

Exemplary System Elements

FIG. 1 shows a block diagram of an exemplary media processing system 100 for capturing and mixing multiple media streams into one or more output media streams. As used herein, a media "unit" is a smallest set of data that can be provided in a given digital media format, e.g., a single frame in MPEG and other video formats is a media unit. Further as used herein, a "stream" means a plurality of units of digital media data in a predefined format (e.g., MPEG, MP3, etc.) being provided to (input) or from (output) a device.

The media processing system 100 may include a media studio 105, one or more media devices 115, and a display device such as a monitor 150. The one or more media devices 115 may include an operator console 120, e.g., a tablet computer, and may further include one or more cameras 125, one or more viewers 130 and one or more media storage devices 135. The media devices 115 may be remote or local to the media studio 105 and may be coupled to the media studio 105 via at least one of a network 140 and a direct wired or wireless connection. A server 145 may also be communicatively coupled to the media studio 105 and the media devices 115 via the networks 140.

The media studio 105 may include a processor 110 that is programmed to receive multiple media input streams, and to combine them into a multiview media item for viewing via the operator console 120 and/or the monitor 150. The media input streams are sometimes referred to herein as individual media items. The multiview media item is an aggregated media content item that includes one or more of the media input items (or streams), arranged to be displayed substantially simultaneously on a user display, such as a touch screen. The media input items may be arranged such that they appear side-by-side, in rows, in a picture-in-picture format, etc. within the user display. In addition, the multiview media item may include, for example, a graphical user interface which is displayed, e.g., on the operator console 120, and accepts user inputs. As described below, the media studio 105 may compress the multiview media item prior to providing it to one of the media devices 115 (e.g., data provided according to MPEG or the like is compressed) such as the operator console 120 and/or the storage devices 135.

The media input streams may be visual and/or audio data such as videos captured by a video camera 125, sounds captured by a microphone, scenes from a security camera 125, etc. The media input streams may be, e.g., streamed data or static data such as single digital photographs. The media studio 105 is further operable to receive commands from the operator console 120, and to generate a media output item or stream according to the received commands. The media output item may include data from one or more of the media input items.

As an example, the media studio 105 may receive four media input items. The media studio 105 may generate a multiview media item including each of the four media input items, and transmit the multiview media item to the operator console 120. A user of the operator console 120 may select, via a user interface, one of the four views in the multiview media item to be included in the media output item. The media studio 105 processor 110 may be programmed to generate the media output item that includes the selected media input item, based on a command received from the operator console 120. The media output item may be transmitted via a network 140 to be shared with viewers 130, outputted to a monitor 150, and/or stored in a storage device 135.

In addition to selecting one or more media input items to be included in the media output item, the media studio 105 processor 110 may be programmed to perform various media processing operations, e.g., scaling, mixing, morphing, compositing, adding overlays, etc., based on commands received from the operator console 120. Additionally or alternatively, the processor 110 may be programmed to perform object tracking, image stabilization, etc.

The network 140 represents one or more mechanisms for delivering media content between the media studio 105 and the media devices 115. Accordingly, the network 140 may be one or more of various wired or wireless communication mechanisms, including any desired combination of wired, e.g., cable, fiber, etc., and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc.

In addition to the one or more networks 140, one or more wired or wireless direct connections 155 may be used to connect the media studio 105 to the media devices 115. Direct connections 155 may include e.g., Bluetooth, Universal Serial Bus (USB), high-definition multimedia interfaces (HDMI), custom serial interfaces, etc.

In particular, one or more high-definition multimedia interfaces (HDMI) may be used to transfer data between a media device 115 and the media studio 105, or from the media studio 105 to the monitor 150. HDMI is a well-known, proprietary audio/video interface for transferring uncompressed video data and compressed or uncompressed digital audio data from an HDMI-compliant source device such as the media device 115 to a digital media processing device such as the media studio 105 or to the compatible computer monitor, e.g., the monitor 150.

The server 145 may be communicatively coupled to the media studio 105 and the media devices 115 via the network 140. The server 145 may include a communications circuit for communications via the network 140, and may further include memory and one or more processors configured to perform programs, i.e., sets of computer-executable instructions, stored in the memory. The server 145 may, e.g., receive media output items and store the media output items for future use.

Media content, such as the media input items (streams), media output items (streams), and/or multiview media items, is generally delivered via the network 140 in a digital format, e.g., as compressed audio and/or video data, and may include media data and metadata. For example, Moving Picture Experts Group (MPEG) refers to a set of standards generally promulgated by the International Standards Organization/International Electrical Commission MPEG. H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), HEVC/H.265, or according to some other standard or standards. For example, media content could be audio data formatted according to standards such as MPEG-2 Audio Layer III (MP3), Advanced Audio Coding (AAC), etc. Further, the foregoing standards generally provide for including metadata.

The camera 125 captures media data, i.e., visual and sound data such as photographs and videos, and transmits the media data, e.g., via the network 140, to the media studio 105. Examples of cameras 125 include portable devices such as smartphones, tablets, laptops, digital cameras, etc., including one or more data collectors for collecting media data. The collected media data may include visual data and audio data. Examples of cameras 125 may further include security cameras, traffic cams, cameras transported by drones, etc.

The viewer 130 may be used to display media output data received from the media studio 105, and may include a display such as a liquid crystal display (LCD) or plasma display. The media data may be received, for example, via the network 140 or via the direct connection 155. Examples of the viewer 130 include mobile devices such as mobile phones, tablets, and laptops and may further include devices such as digital televisions. The viewer 130 may receive, e.g., Full HD data, providing an image resolution of 1920 by 1080 pixels. Data formats with other resolutions may also be used.

The storage device 135 may store media data and provide an interface to allow the media studio 105 to access the data via the network 140 or via the direct connection 155. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), secure digital (SD) card, a hard drive, etc. Further, the media storage device 135 may include a processor, programmed, for example, to receive commands from the media studio 105. The processor may be further programmed, based on the commands, to retrieve media data items from data storage, and send the media data items to the media studio 105.

Communications between the storage device 135 and the media studio 105 may be performed via the network 140. Additionally or alternatively, communications may be performed via the direct connection 155. For example, the storage device 135 may be connected to the media studio 105 via a Universal Serial Bus (USB) port, or other wired or wireless interface.

The operator console 120 may be used to control the operation of the media studio 105. The operator console 120 may include a memory and a processor, the memory storing program code, i.e., computer-executable instructions, executable by the processor. The operator console 120 user interface may be communicatively coupled to the operator console 120 processor and may include one or more input devices such as a microphone, buttons, a touchscreen display, a mouse, a keyboard, a gesture-recognition device, switches, etc., for receiving input from the user. The user interface may further include one or more output devices such as a display, lamps, speakers, etc. for communicating information to the user. All or a portion of the user interface may be physically separate from the operator console. For example, the operator console 120 may be a tablet computer which projects its output to another screen, (e.g., air-play), while the operator continues to control the media studio 105 from the tablet computer.

The communications circuit may include a radio frequency (RF) transceiver for WiFi communications (typically 2.4 GHz or 5 GHz bands). The RF transceiver may communicate, for example, directly with a RF receiver included in the media studio 105. Additionally or alternatively, the communications circuit may include, e.g., an Ethernet interface, a Universal Serial Bus (USB) interface, a Bluetooth transceiver, a high-definition multimedia interface (HDMI), etc.

In addition to commands related to selecting media input items for display in the media output item, commands from the operator console 120 may include instructions to perform functions such as scaling, mixing, morphing, compositing, adding overlays, etc. Further, commands from the operator console 120 may include instructions to perform functions such as object tracking, image stabilization, etc.

The media studio 105 may include an internal memory and a processor 110, the memory storing program code, i.e., computer-executable instructions, executable by the processor 110. The processor 110 is communicatively coupled to the media devices 115, e.g., via the network 140. The internal memory may be, e.g., read only memory (ROM), random access memory (RAM), flash memory, electrically programmable memory (EPROM), electrically programmable and erasable memory (EEPROM), embedded MultiMediaCard (eMMC), a hard drive, etc., and may be used to store programs executable by the processor 110, as well as to store, for example, data representing inputs from the user, instructions received from the operator console 120, media data received from a remote media device 115, etc.

Additionally, the media studio 105 may include a high-definition media interface (HDMI) for connecting to a media device 115, such as a camera 125.

The media studio 105 processor 110 may, in some cases, generate a multiview media item. The multiview media item may include, for example, a picture-in-picture (PIP) display, wherein two or more of the media input items or streams are displayed simultaneously, e.g., side-by-side, within the multiview media item. The media studio 105 may transmit the multiview media item via the network 140 to one or more of the media devices 115, such as the operator console 120 or the storage devices 135.

The media studio 105 processor 110 is further programmed to receive commands from the operator console 120. Based on the commands, the media studio 105 may generate a media output item or stream. The media studio 105 may select data from one or more of the media input items to include in the media output item. The media studio 105 may further, based on commands received from the operator console 120, perform various media processing functions such as scaling, mixing, morphing compositing, adding overlays, tracking of specific people or objects, smart tagging etc. related to the generation of the media output item.

In addition, the media studio 105 may perform media processing functions based on predetermined rules for generating the media output item. Examples of rules are discussed below.

The media studio 105 processor 110 may output the media output item e.g., to viewers 130, to the operator console 120, and/or to other display devices. Additionally or alternatively, the media studio 105 may output the media output item, e.g., to a server 145, or to storage devices 135, where the media output item may be stored for future use.

The media devices 115 such as cameras 125 may collect and transmit the media data, e.g., via the network 140, or via the direct connection 155, to the media studio 105. The collected media data may be, e.g., full high-definition (Full HD) data, providing an image resolution of 1920 by 1080 pixels.

Typically, the media data is transmitted by the media device 115, e.g., the camera 125, based on a transmission rate. Each of the transmitted media units (e.g., frames) may further include at least one of video and audio data. The transmission rate defines a rate of streaming media data including media units from a transmitter, e.g., the camera 125, to a receiver, e.g., the media studio 105. The transmission rate may be identified in various units such as frames per second (fps). In one example, the camera 125 may stream media data with a rate of 30 fps. Thus, the camera 125 may transmit an image frame (or a media unit) each 33.33333 milliseconds.

To transmit the media data from the media device 115 at a given rate, e.g., 30 fps, the media device 115 may include an electronic circuit such as a processor to capture and transmit the media data. In one example, the processor is programmed to capture an image frame and transmit the captured image frame based on a running clock of the media device 115. For example, the media device 115 may include an electronic oscillator circuit that uses a mechanical resonance of a vibrating crystal of piezoelectric material to create an electrical signal with a precise frequency. The media device 115 may operate based on a clock rate of e.g., 1 kilohertz (kHz) based on the output of the electronic oscillator circuit. The media device 115 processor may count the clock pulses generated by the running clock each 1 ms to determine a time of capturing and transmitting a new image frame. In this example, starting from a time 0 (zero), the processor of the media device 115 may capture image frames at 0, 33 ms, 66 ms, etc., because based on the clock rate of 1 kHz, the media device 115 is unable to generate timestamps having a more accurate resolution than one millisecond, e.g., it cannot generate timestamps of 33.33333 ms, 66.66666 ms, etc. Additionally or alternatively, the clock rate of the media device 115 may be inaccurate. For example, a time difference between two consecutive clock pulses may be different from 1 ms, e.g., 1.1 ms. That inaccuracy may then cause a transmission of a frame at a time index of 33.1 ms instead of at an expected time index of 33.33.

A time of capturing and/or transmitting the media unit may be recorded in a so called time stamp associated with the transmitted media unit. For example, the transmitted media unit may include a time stamp data record that includes the associated time. Thus, a receiver of the media unit may identify the time associated with the media unit by the transmitter based on the included time stamp. Various media streaming technologies provide different mechanisms for associating a time stamp to the transmitted media data.

Further, a receiver of the streamed media data, e.g., the media studio 105, may have a different clock rate than a media capture device 115. For example, the media studio 105 may have a clock rate of 1000 kHz, i.e., a clock pulse duration of 1 microsecond ($\mu s$). Thus, with reference to the above example of 30 fps, the media studio 105 processor 110 may be programmed to expect the media units at 0, 33.333 ms, 66.666 ms, etc. Therefore, based on differences in clock rates of the transmitter versus the receiver, and/or an inaccuracy of a media transmitting device 115 clock rate, a mismatch may be caused between the time stamp associated with the media unit and a time stamp that the receiver expects, e.g., 33 ms versus 33.333 ms. This mismatch may impair one or more operations of the media studio 105. In one example, the media studio 105 processor 110 may be programmed to generate a multiview media item including media streams respectively received from two cameras 125. The mismatch of time stamps associated with the received media units from the cameras 125 and the media studio 105 may impair media studio 105 in generating a multiview item, or may prevent such operation altogether.

Figure 2:
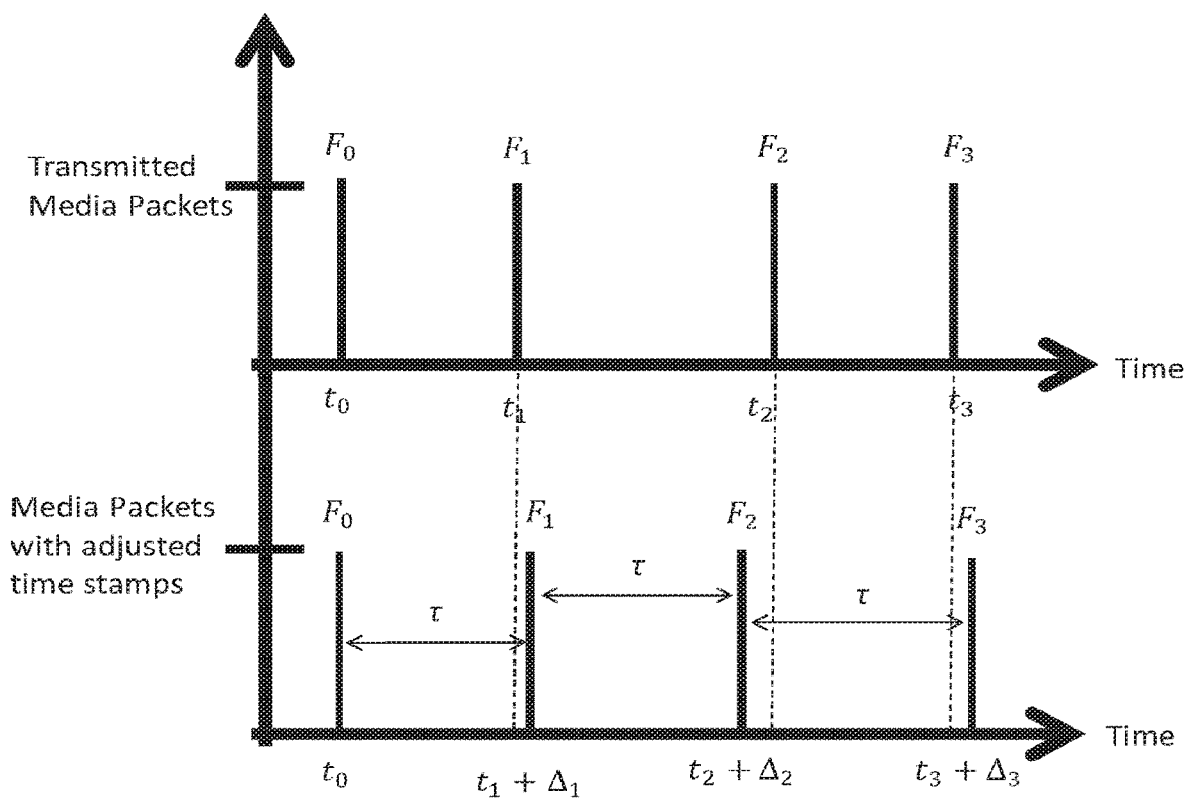
FIG. 2 is a graph showing transmitted media units and adjusting of media units time stamps.

With reference to FIG. 2, the media studio 105 processor 110 may be programmed to receive first and second media units $F_0$, $F_1$ with respective first and second time stamps $t_0$, $t_1$ that are assigned based on a first clock cycle time $C_1$ and a data transmission rate R. The processor 110 may be further programmed to assign an adjusted time stamp $t_1+\Delta_1$ to the second media unit $F_1$ based on the first clock cycle time $C_1$, a second clock cycle time $C_2$, the first time stamp $t_0$, and the data transmission rate R. In this example, $t_1$ is a timestamp of the unit $F_1$ when it is received by the studio 105, and is $\Delta_1$ is an amount of time by which the time $t_1$ is adjusted, i.e., in this example, an amount of time added to the time $t_1$.

With reference to the example described above, the camera 125 may transmit the media units $F_0$, $F_1$ at $t_0$, $t_1$ corresponding to 0 ms and 33 ms. The processor 110 may be programmed to assign the adjusted time stamps 0 ms and 33.333 ms based on the first clock cycle time $C_1$ of 1 ms, the second clock cycle time $C_2$ of 1 $\mu s$, the second time stamp 33 ms, and the transmission rate of 30 fps. Thus, the processor 110 may determine that $\Delta_1$ is 0.333 ms. As another example, with a second cycle time $C_2$ of 10 megaherz (MHz), the processor 110 may be programmed to determine that $\Delta_1$ is 3.3 $\mu s$.

In general, the adjustment value $\Delta$ represents a time adjustment associated with a time stamp and can be either a positive or a negative value. For example, a third media unit $F_2$ may have a time stamp of 67 ms. The processor 110 may be programmed to assign an adjusted third time stamp 66.666 ms based on the first clock cycle time $C_1$ of 1 ms, the second clock cycle time $C_2$ of 1 $\mu s$, the third time stamp 67 ms, and the transmission rate of 30 fps. Thus, the processor 110 may determine that $\Delta_1$ is −0.334 ms. As another example, with a second cycle time $C_2$ of 10 megahertz (MHz), the processor 110 may be programmed to determine a $\Delta_1$ of −3.4 $\mu s$.

In one example, an adjusted time stamp may be a nearest possible time stamp to the received media unit time stamp that is divisible by the receiver clock cycle time. With reference to the example above, the time stamp of the received frame $F_2$ is 67 ms. Based on the transmission rate R and the receiver clock cycle time $C_2$, an expected time $\tau$ between two consecutive frames is 33.333 ms. Here should be noted that 33.333 ms is divisible by the clock cycle time $C_2$ of 1 $\mu s$, whereas, e.g., 33.3333 ms, is not divisible by the 1 ms. Thus, possible adjusted time stamps may include 66.666 ms, 99.999 ms, etc. Therefore, nearest possible stamp to the received media unit time stamp of 67 ms is 66.666 ms. That results in the adjustment value $\Delta_1$ of −0.334 ms.

As shown in the examples above, the second clock cycle time $C_2$ of 1 $\mu s$ is less than the first clock cycle time $C_1$ of 1 ms. Alternatively, the second clock cycle time $C_2$ may be greater than the first clock cycle time $C_1$. For example, the processor 110 may be programmed to assign an adjusted time stamp of 33 ms to a media unit received with a time stamp of 33.333 ms, based on the transmission rate of 30 fps, a first clock cycle time $C_1$ of 1 μs, and a second clock cycle time of 1 ms.

As another example, the processor 110 may be programmed to replace the second time stamp $t_1$ with the adjusted time stamp $t_1+\Delta_1$. Additionally or alternatively, the processor 110 may be programmed to associate a separate data record to the second media unit $F_1$ that holds the adjusted time stamp $t_1+\Delta_1$.

Figure 3:
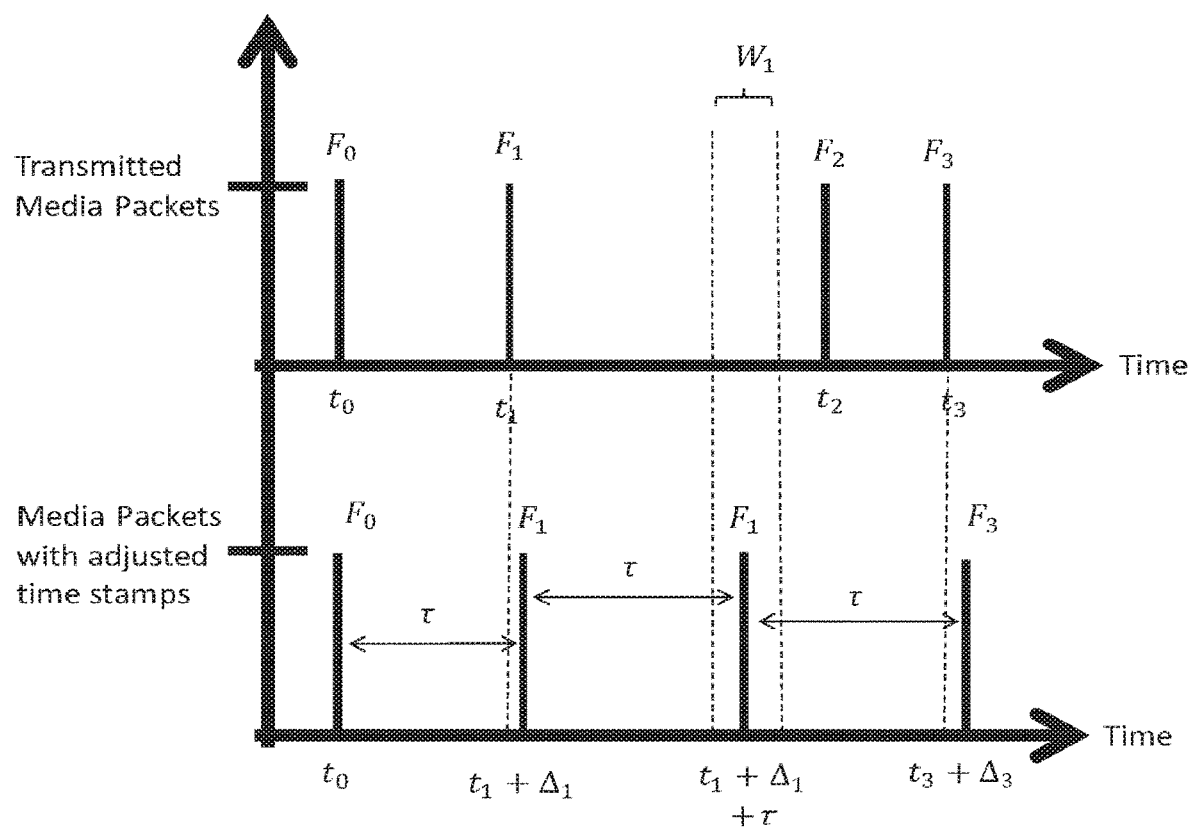
FIG. 3 is a graph showing a media unit discarded after being received outside an expected time interval.

With reference to FIG. 3, the processor 110 may be programmed to assign an adjusted time stamp to a media unit only upon determining that the second time stamp is within an expected time interval. For example, the processor 110 may be programmed to discard a third media unit $F_2$, upon determining that the third time stamp $t_2$ is outside an expected time interval $W_1$. The expected time interval $W_1$ may be defined based on an expected time stamp and a maximum deviation threshold. For example, an expected time interval $W_1$ for an expected time stamp of 66.666 ms and a maximum deviation threshold of 750 μs may include any time between 65.916 ms and 67.416 ms.

In one example, the processor 110 may be programmed to determine the maximum deviation threshold based on the first clock cycle time $C_1$, and the second clock cycle time $C_2$. Thus, the expected time interval $W_1$ may be in part based on the transmission rate R, the first clock cycle time $C_1$, and the second clock cycle time $C_2$. For example, the processor 110 may be programmed to determine the maximum deviation threshold by determining maximum of the clock cycle times $C_1$, $C_2$. With reference to the above example, the maximum deviation threshold may be 1 ms which is the maximum of 1 ms and 1 μs. As another example, the processor 110 may be programmed to determine the expected time interval $W_1$ based on the first clock cycle time $C_1$ and a plurality of time stamps $t_0$, $t_1$ associated with a plurality of last received media units $F_0$, $F_1$. For example, the processor 110 may be programmed to determine an inaccuracy of the first clock cycle time $C_1$ of the transmitter based on a plurality of consecutive media units $F_0$, $F_1$. The processor 110 may be further programmed to determine the expected time interval $W_1$ at least in part based on the determined inaccuracy of the transmitter. For example, the processor 110 may be programmed to determine an average inaccuracy of time stamps of last 10 media units by comparing timestamps to respective expected receiving times and multiple the average inaccuracy by 3. Thus, if the average inaccuracy of time stamps of the last 10 media units is 1 ms, the processor 110 may determine that the maximum deviation threshold is 3 ms which is 1 ms multiplied by factor 3.

In one example, the processor 110 may be further programmed to re-use the media unit $F_1$ as a next unit in a media stream instead of the media unit $F_2$, upon discarding the second media unit. Thus, advantageously, the receiver, e.g., the media studio 105, is not provided a media stream with a missing media unit, i.e., no until at a time index when the media unit $F_2$ is expected. For example, as shown in FIG. 3, the processor 110 may be programmed to re-use the media unit $F_1$ instead of expected media unit $F_2$ by assigning an adjusted time stamp $t_1+\Delta_1+\tau$. Thus, the processor 110 may be programmed to reuse (or reinstitute) the media unit $F_1$ for a second time with a time stamp $t_1+\Delta_1+\tau$. Thus, the re-used media unit F1 with the time stamp $t_1+\Delta_1+\tau$ may be a replacement for the discarded second media unit.

Figure 4A:
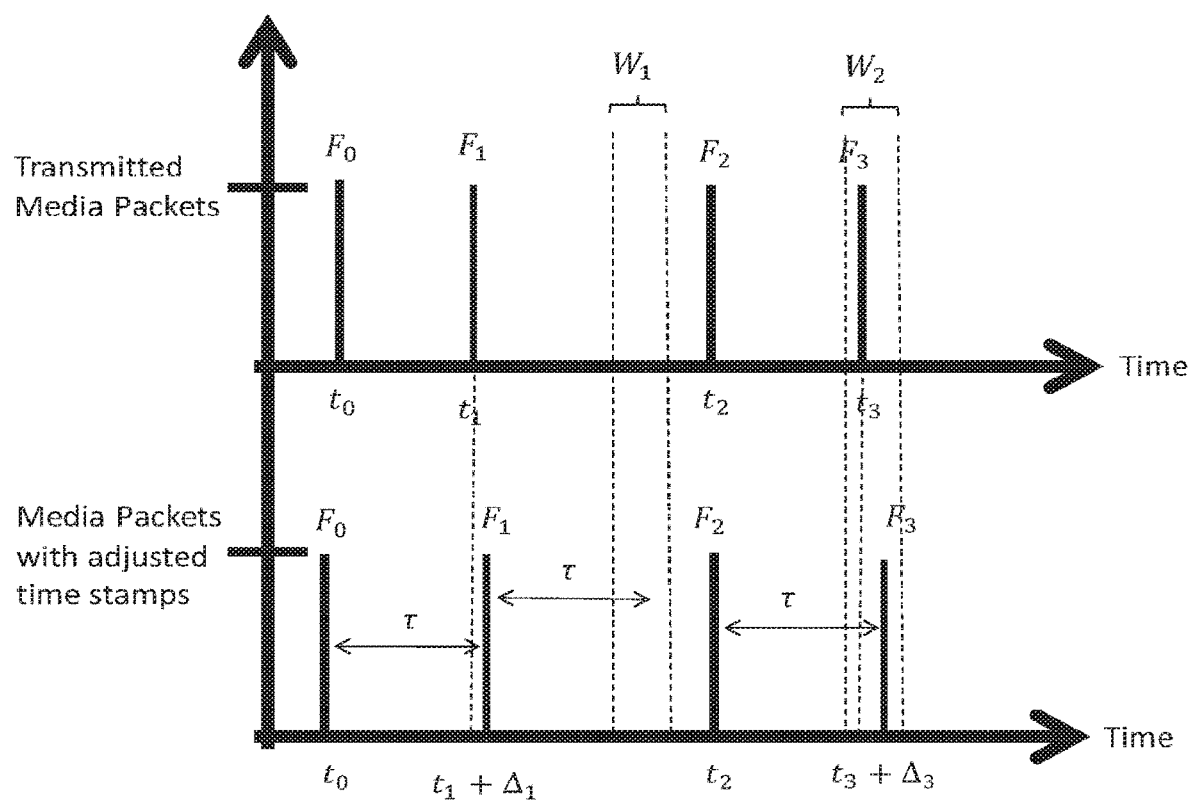
FIG. 4A is a graph showing a media unit accepted after being received outside an expected time interval.

Alternatively, as shown in FIG. 4A, the processor 110 may be programmed to prevent an adjustment of the second time stamp $t_2$ upon determining that the second time stamp $t_2$ is outside an expected time interval $W_1$. In other words, the processor 110 may be programmed to process, e.g., reproduce, the media unit $F_2$ using the time stamp $t_2$ without any adjustment thereof.

The processor 110 may be programmed to receive, subsequent to the media unit $F_2$, a third media unit $F_3$ with a time stamp $t_3$, and assign an adjusted third time stamp $t_3+\Delta_3$ to the third media input $F_3$ based at least in part on the second time stamp $t_2$. In one example, as shown in Table 1, the processor 110 may be programmed to expect the third media input $F_3$ in a time that is based in part on the time stamp of the media input $F_2$. In this example, the processor 110 may be programmed to expect the third media input $F_3$ at 108.333 ms which is 33.333 ms after the received time stamp $t_2$, rather than at 99.999 ms which is 33.333 ms after an expected second time stamp for the second media input $F_2$.

The processor 110 may be programmed to determine a second expected time interval $W_2$ for the third media input F3, based at least in part on the second time stamp $t_2$. For example, with a given maximum deviation threshold of 750 μs (as described with reference to FIG. 3), the processor 110 may be programmed to determine the second time interval $W_2$ to be between 107.583 ms and 109.083 ms, i.e., a time between 108.333 ms-750 μs and 108.333 ms+750 μs.

TABLE 1

| Expected timestamp (ms) | Received timestamp (ms) | Adjusted timestamp (ms) |
| --- | --- | --- |
| 0 | 0 | 0 |
| 33.333 | 33.000 | 33.333 |
| 66.666 | 75.000 | 75.000 |
| 108.333 | 108.000 | 108.333 |

Figure 4B:
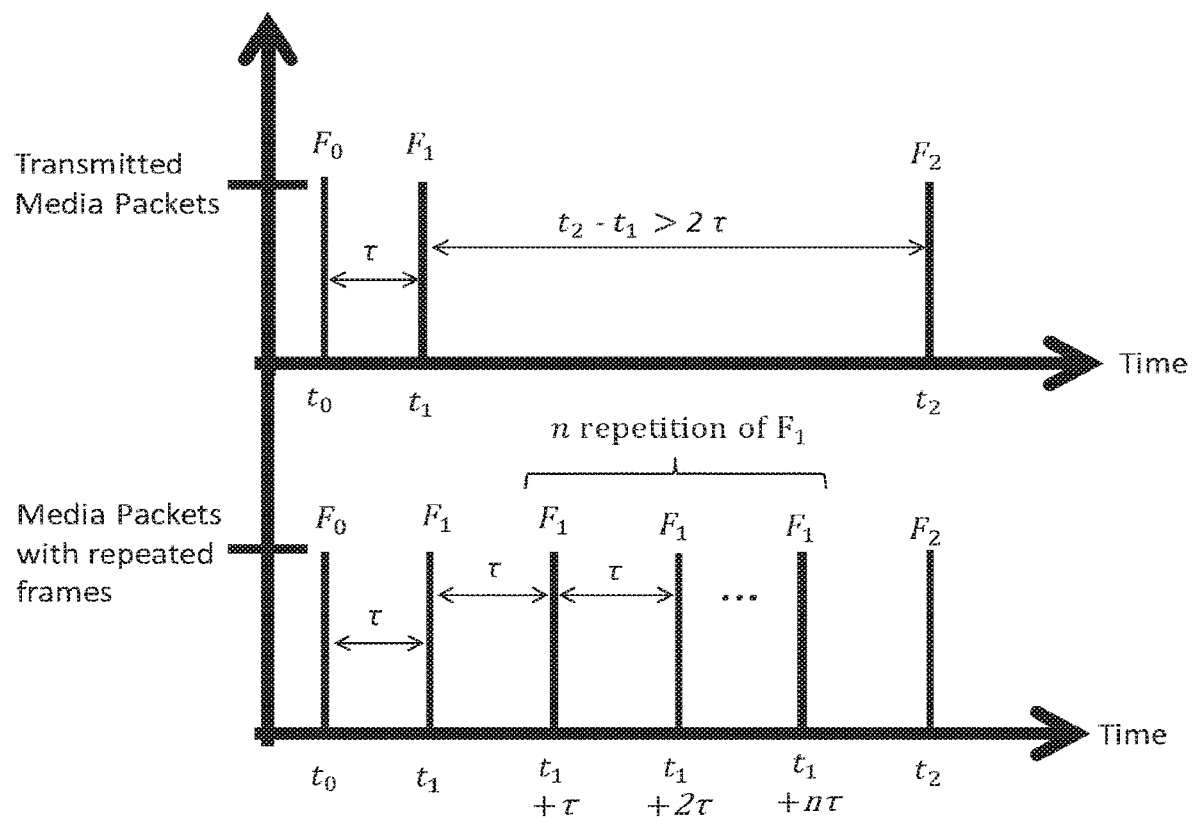
FIG. 4B is a graph showing a last media unit repeated until a next media unit is received.

FIG. 4B is a graph showing a last media unit repeated until a next media unit within an expected time interval is received. The processor 110 may be programmed to re-use, e.g., repeat, the last received media unit $F_1$ upon determining that a second time stamp $t_2$ of a next frame immediately following the media unit $F_1$ is outside a second time threshold, e.g., $2\tau$, which is greater than the expected time interval $W_1$. Re-using or repeating the last media unit means reproducing (or rerecording) same content, e.g., audio and/or video data, of the last media unit, e.g., the media unit $F_1$, with new time stamps $t_1+\tau$, $t_1+2\tau$, $t_1+3\tau$, etc. A number of repetitions n of the last media unit $F_1$ may be determined based on the operation (1).

$$n = \left(\frac{t2-t1}{\tau}\right) - 1 \qquad (1)$$

Processing

Figure 5:
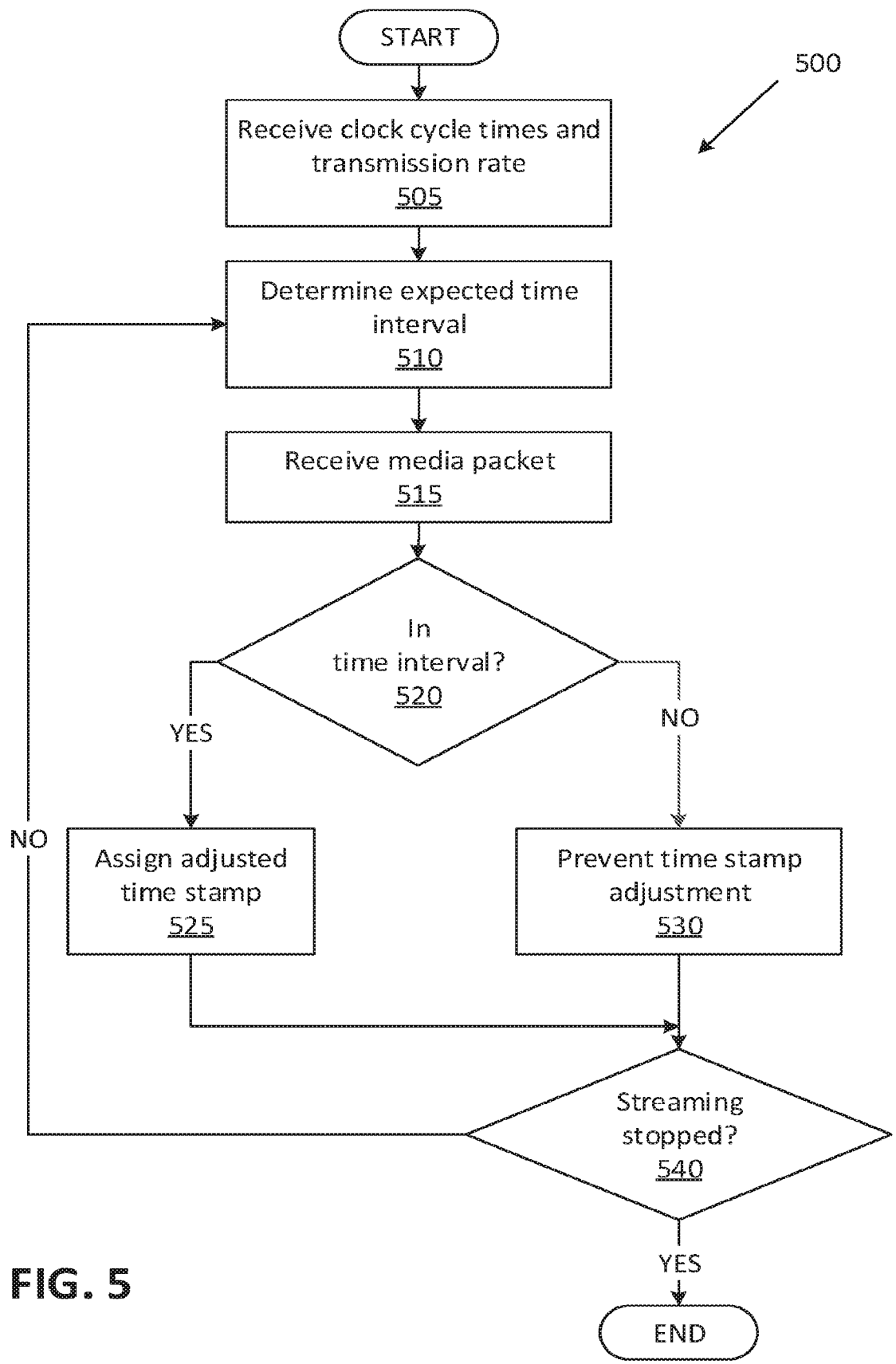
FIG. 5 is an example flowchart showing a process for synchronization of received media units.

FIG. 5 is a flowchart of an exemplary process 500 for synchronization of media units received at a receiver such as the media studio 105. For example, the media studio 105 processor 110 may be programmed to execute blocks of the process 500.

The process 500 begins in a block 505, in which the processor 110 receives system 100 information such as transmission rates, clock cycle times, etc., of media devices 115 and the media studio 105. In one example, the processor 110 may be programmed to receive information associated with the media devices 115 such as the transmission rate R or the clock cycle times $C_1$, $C_2$ by sending a request via the network 140 to the respective media device 115, and then receiving a reply from the respective media device 115. Additionally or alternatively, the processor 110 may be programmed to determine the system 100 information, e.g., based on stored information in the media studio 105 memory.

Next, in a block 510, the processor 110 determines expected time intervals W for the media units received from a transmitter. For example, the processor 110 may determine the expected time interval W for media units of the camera 125 based on the processor 110 clock cycle time $C_2$, the camera 125 transmission rate R, the camera 125 clock cycle time $C_1$, and the time stamp of a last received media unit. Note that the processor 110 may be programmed to determine the expected time interval W after at least receiving two media units; as described above, the expected time interval W may be defined based on a time stamp of the last received media unit.

Next, in a block 515, the processor 110 receives a media unit, e.g., an image frame. The received media unit may include a time stamp that is determined by the transmitter of the media unit. Alternatively, the processor 110 may be programmed to determine the time stamp of a received media unit based on a time of receipt of the media unit. For example, the processor 110 may be programmed to associate a time stamp 33.11 ms when the transmitter captures and transmits the media unit at 33 ms, and a travel time from the transmitter to the receiver is 110 µs. In this example, the processor 110 may be programmed to use this -assigned-by-receiver time stamp as the time stamp of the received media unit which may be further adjusted by the processor 110, as discussed below.

Next, in a decision block 520, the processor 110 determines whether the received media unit is within the expected time interval. For example, the processor 110 may have determined the expected time interval to be between 33 ms and 34 ms. Then, the received media unit $F_1$ with the time stamp $t_1$ may be within the expected time interval of 33-34 ms. As another example, as shown in FIG. 3, the received media unit $F_2$ may have a time stamp $t_2$ that is outside the expected time interval $W_1$. If the processor 110 determines that the time stamp of the received media unit is within the expected time interval, then the process 500 proceeds to a block 525; otherwise the process 500 proceeds to a block 530.

In the block 525, the processor 110 assigns an adjusted time stamp to the received media unit. As described above, the processor 110 may be programmed to determine an adjusted time stamp based on the transmission rate R, the clock cycle time C1 of the transmitter, the clock cycle time C2 of the receiver, e.g., the media studio 105, the time stamp of the received media unit.

In the block 530, the processor 110 prevents an adjustment of the time stamp of the received media input. For example, the processor 110 may be programmed to process, e.g., reproduce, the received media input without adjusting the timestamp thereof. The processor 110 may be programmed to determine an expected time interval for a subsequent media input based on the time stamp of the received media input. Alternatively, the processor may be programmed to discard the received media unit. For example, with reference to FIG. 3, the processor 110 may be programmed to discard the information provided in the media studio 105 memory that includes image and/or audio data associated with the received media unit $F_2$. In this example, the processor 110 may re-use last received media unit. For example, as shown in FIG. 3, the processor 110 may be programmed to re-use the media unit $F_1$ that was received prior to the media unit $F_2$.

In a decision block 540, the processor 110 determines whether media streaming is stopped. For example, the processor 110 may determine that the media stream has stopped based on receiving a message from a media device 115 including a communication termination notification. Additionally or alternatively, the processor 110 may determine that the media streaming has stopped based on determining that at least a specific number, e.g., 10, of consecutive media units have not been received. If the processor 110 determines that the media streaming stopped, then the process 500 ends; otherwise the process 500 returns to the block 510.

Figure 6:
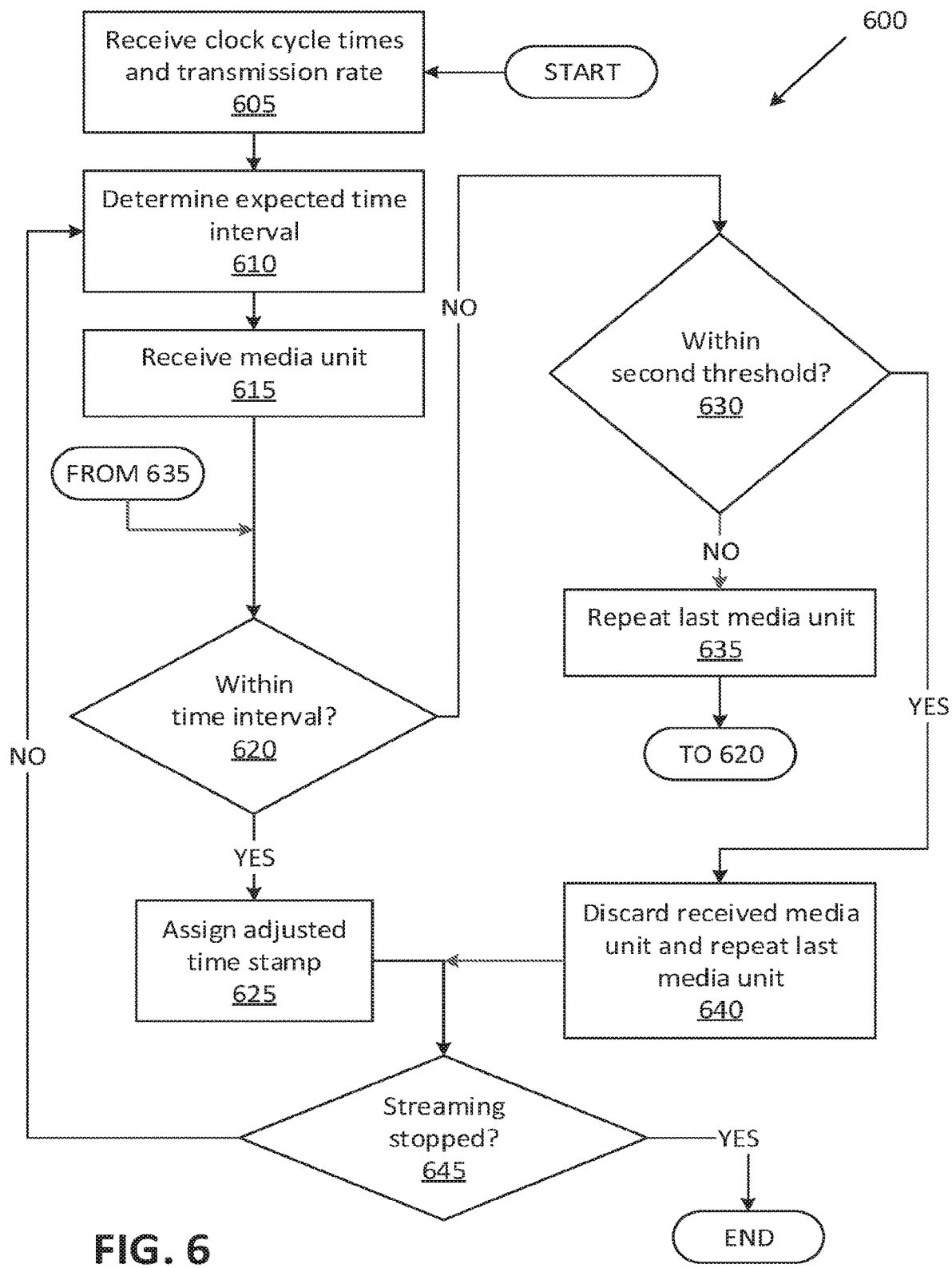
FIG. 6 is another example flowchart showing a process for synchronization of received media units.

FIG. 6 is a flowchart of another exemplary process 600 for adjusting time stamps of media units received at a receiver such as the media studio 105. For example, the media studio 105 processor 110 may be programmed to execute blocks of the process 600.

The process 600 begins in a block 605, in which the processor 110 receives system 100 information such as transmission rates, clock cycle times, etc., of media devices 115 and the media studio 105. In one example, the processor 110 may be programmed to receive information associated with the media devices 115 such as the transmission rate R or the clock cycle times $C_1$, $C_2$ by sending a request via the network 140 to the respective media device 115, and then receiving a reply from the respective media device 115. Additionally or alternatively, the processor 110 may be programmed to determine the system 100 information, e.g., based on stored information in the media studio 105 memory.

Next, in a block 610, the processor 110 determines expected time intervals W for the media units received from a transmitter. For example, the processor 110 may determine the expected time interval W for media units of the camera 125 based on the processor 110 clock cycle time $C_2$, the camera 125 transmission rate R, the camera 125 clock cycle time $C_1$, and the time stamp of a last received media unit. Note that the processor 110 may be programmed to determine the expected time interval W after at least receiving two media units; as described above, the expected time interval W may be defined based on a time stamp of the last received media unit.

Next, in a block 615, the processor 110 receives a media unit, e.g., an image frame. The received media unit may include a time stamp that is determined by the transmitter of the media unit. Alternatively, the processor 110 may be programmed to determine the time stamp of a received media unit based on a time of receipt of the media unit. For example, the processor 110 may be programmed to associate a time stamp of 33.11 ms when the transmitter captures and transmits the media unit at 33 ms, and a travel time from the transmitter to the receiver is 110 µs. In this example, the processor 110 may be programmed to use this assigned-by-receiver time stamp as the time stamp of the received media unit which may be further adjusted by the processor 110, as discussed below.

Next, in a decision block 620, the processor 110 determines whether the received media unit is within the expected time interval, e.g., the time interval $W_1$. For example, the processor 110 may have determined the expected time interval to be between 33 ms and 34 ms. Then, the received media unit $F_1$ with the time stamp $t_1$ may be within the expected time interval of 33-34 ms. As another example, as shown in FIG. 3, the received media unit $F_2$ may have a time stamp $t_2$ that is outside the expected time interval $W_1$. In yet another example, as shown in FIG. 4B, the received media unit $F_2$ may have a time stamp $t_2$ that is outside the expected time interval $W_1$ and beyond the second time threshold, e.g., $2\tau$. If the processor 110 determines that the time stamp of the received media unit is within the expected time interval, then the process 600 proceeds to a block 625; otherwise the process 600 proceeds to a decision block 630.

In the block 625, the processor 110 assigns an adjusted time stamp to the received media unit. As described above, the processor 110 may be programmed to determine an adjusted time stamp based on the transmission rate R, the clock cycle time C1 of the transmitter, the clock cycle time C2 of the receiver, e.g., the media studio 105, the time stamp of the received media unit. Following the block 625, the process 600 proceeds to a decision block 645.

In the decision block 630, the processor 110 determines whether a media unit is received within the second time threshold. The processor 110 may be programmed to determine whether a media unit is received within the second time threshold, e.g., $2\tau$ (i.e., if $t_2-t_1<2\tau$). If the processor 110 determines that a media unit is received within the second time threshold, then the process 600 proceeds to a block 640; otherwise the process 600 proceeds to a block 635.

In the block 635, the processor 110 repeats the last media unit. For example, as shown in FIG. 4B, the processor 110 may be programmed to repeat the last media unit $F_1$ with an expected time stamp, e.g., at a time $t_1+\tau$. The expected time stamp is determined based on the last reproduced media unit, the transmission rate R, etc. Thus, if the last media unit is already repeated at the time $t_1+\tau$, the processor 110 may determine the expected time $t_1+2\tau$. In other words, the processor 110 may repeat the frame $F_1$ at the time $t_1+2\tau$. Following the block 635, the process 600 returns to the decision block 620

In the block 640, the processor 110 discards the received media unit and repeats the last media unit. For example, with reference to FIG. 3, the processor 110 may be programmed to discard the information provided in the media studio 105 memory that includes image and/or audio data associated with the received media unit $F_2$, and to repeat the last received media unit. For example, as shown in FIG. 3, the processor 110 may be programmed to re-use the media unit $F_1$ that was received prior to the media unit $F_2$. Following the block 640, the process 600 proceeds to the decision block 645.

In a decision block 645, the processor 110 determines whether media streaming is stopped. For example, the processor 110 may determine that the media stream has stopped based on receiving a message from a media device 115 including a communication termination notification. Additionally or alternatively, the processor 110 may determine that the media streaming has stopped based on determining that at least a specific number, e.g., 10, of consecutive media units have not been received. If the processor 110 determines that the media streaming stopped, then the process 600 ends; otherwise the process 600 returns to the block 610.

Advantageously, when timestamps of a media stream are adjusted based on the present disclosure, a table size of media stream, e.g., an MP4 format video and audio stream, may be reduced compared to when the time stamps are not adjusted. In one example, sizes of known tables "Sample-to-Time" and "Sync Sample Atoms" for storing the information of audio and video data may be reduced.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
receive first and second media units with respective first and second time stamps that are assigned based on a first clock cycle time and a data transmission rate parameter defined as a rate of streaming media data per time unit;
assign an adjusted time stamp to the second media unit based on the first clock cycle time, a second clock cycle time, the first time stamp, and the data transmission rate; and
replace the second time stamp with the adjusted time stamp, or
associate a separate data record with the second media unit, said separate data record storing the adjusted time stamp.

2. The system of claim 1, wherein the adjusted time stamp is a nearest time stamp to the second time stamp based on the transmission rate, and is divisible by the second clock cycle time.

3. The system of claim 1, wherein the second clock cycle time is less than the first clock cycle time.

4. The system of claim 1, wherein the instructions include further instructions executable by the processor to assign the adjusted time stamp to the second media unit only upon determining that the second time stamp is within an expected time interval.

5. The system of claim 4, wherein the instructions include further instructions to discard the second media unit upon determining that the second time stamp is outside the expected time interval.

6. The system of claim 5, wherein the instructions include further instructions to discard the second media unit only upon determining that the second time stamp is outside the expected time interval and within a second time threshold greater than the expected time interval.

7. The system of claim 6, wherein the instructions include further instructions to re-use the first media unit instead of the second media unit upon discarding the second media unit.

8. The system of claim 7, wherein the instructions include further instructions to re-use the first media unit by assigning the adjusted time stamp to the first media unit and processing the first media unit with the adjusted time stamp as a replacement for the discarded second media unit.

9. The system of claim 4, wherein the instructions include further instructions to determine the expected time interval based on the first clock cycle time and a plurality of time stamps associated with a plurality of last received media units.

10. The system of claim 4, wherein the instructions include further instructions to determine the expected time interval based on an expected time stamp and a maximum deviation threshold.

11. The system of claim 10, wherein the instructions include further instructions to prevent an adjustment of the second time stamp upon determining that the second time stamp is outside the expected time interval.

12. The system of claim 10, wherein the instructions include further instructions to determine a second expected time interval for a third media unit that is expected subsequent to the second media unit, based at least in part on the second time stamp.

13. The system of claim 10, wherein the instructions include further instructions to:
receive a third media unit, subsequent to the second media unit, with a third time stamp; and
assign an adjusted third time stamp to the third media unit based at least in part on the second time stamp.

14. The system of claim 1, wherein the instructions include further instructions to repeat the first media unit upon determining that the second time stamp is outside an expected time interval and outside a second time threshold greater than the expected time interval.

15. A method comprising:
receiving first and second media units with respective first and second time stamps that are assigned based on a first clock cycle time and a data transmission rate parameter defined as a rate of streaming media data per time unit;
assigning an adjusted time stamp to the second media unit based on the first clock cycle time, a second clock cycle time, the first time stamp, and the data transmission rate; and
replacing the second time stamp with the adjusted time stamp, or
associating a separate data record with the second media unit, said separate data record storing the adjusted time stamp.

16. The method of claim 15, further comprising discarding the second media unit only upon determining that the second time stamp is outside an expected time interval and within a second time threshold greater than the expected time interval.

17. The method of claim 15, further comprising repeating the first media unit upon determining that the second time stamp is outside an expected time interval and outside a second time threshold greater than the expected time interval.

18. A system, comprising:
a client device computer programmed to transmit first and second media units; and
a media studio computer programmed to:
receive, from a media device, first and second media units with respective first and second time stamps that are assigned based on a first clock cycle time and a data transmission rate parameter defined as a rate of streaming media data per time unit;
assign an adjusted time stamp to the second media unit based on the first clock cycle time, a second clock cycle time, the first time stamp, and the data transmission rate; and
replace the second time stamp with the adjusted time stamp, or
associate a separate data record with the second media unit, said separate data record storing the adjusted time stamp.

19. The system of claim 18, wherein the media studio computer is further programmed to repeat the first media unit upon determining that the second time stamp is outside an expected time interval and outside a second time threshold greater than the expected time interval.

20. The system of claim 18, wherein the media studio computer is further programmed to discard the second media unit only upon determining that the second time stamp is outside an expected time interval and within a second time threshold greater than the expected time interval.

* * * * *